(12) United States Patent
Pradhan et al.

(10) Patent No.: US 6,708,109 B1
(45) Date of Patent: Mar. 16, 2004

(54) ACCURATE TARGETING FROM IMPRECISE LOCATIONS

(75) Inventors: Salil V. Pradhan, Santa Clara, CA (US); Cyril Brignone, Mignaloux Beauvoir (FR); Jan Gugala, Palo Alto, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 88 days.

(21) Appl. No.: 10/198,419

(22) Filed: Jul. 18, 2002

(51) Int. Cl.[7] ............................................. G01C 21/26
(52) U.S. Cl. .................... 701/207; 701/211; 701/213
(58) Field of Search ....................... 701/207, 211, 701/213, 23, 28; 180/167–169

(56) References Cited

U.S. PATENT DOCUMENTS 4,846,297 A * 7/1989 Field et al. ................. 180/169
4,996,468 A * 2/1991 Field et al. ................. 180/169
5,470,233 A * 11/1995 Fruchterman et al. ......... 701/1

OTHER PUBLICATIONS

Salil Pradhan, interview with; Websign: Putting E–Services on Main Street, Oct. 2001; http://www.hpl.hp.com/news/2001/jul–sept/w ebsign.html; 7 pages.

* cited by examiner

Primary Examiner—Richard M. Camby

(57) ABSTRACT

Compensation for tolerances inherent in state-of-the-art locating and targeting. Based upon known approximate position and heading of the spotter, and certain data related to objects with the a vision area, an expanded field of vision related to the perspective of a virtual spotter location is generated. Compensation for present location variance due to locator equipment inherent tolerance is provided such that targeting of each object in the vision area can be precisely implemented.

18 Claims, 5 Drawing Sheets

Pᵢ = POSSIBLE USER POSITION
V(Pᵢ) = VISION AREA FORM Pᵢ
Γ = LOCATION "INCERTITIUDE CIRCLE" = {Pᵢ}

EXTENDED DEVICE VISION $E = \bigcup_{P_i \in \Gamma} V(P_i)$

OBJECTS TO DETECT = {OBJECTS $\in$ E}

ACCURATE TARGETING FROM IMPRECISE LOCATIONS

CROSS-REFERENCE TO RELATED APPLICATIONS

Not Applicable.

STATEMENT REGARDING FEDERALLY SPONSORED RESEARCH OR DEVELOPMENT

Not Applicable.

REFERENCE TO AN APPENDIX

Not Applicable.

BACKGROUND

1. Field of Technology

The field of technology relates generally to navigating, and more particularly to locating spotter position and targeting objects.

2. Description of Related Art

The physical world comprises physical objects and locations. There are many known devices and systems associated with navigating the physical world. Most relate to use of one or more, substantially constant, signal emitters, or "beacons," where the signal is something associated with a particular physical location of the beacon.

With the proliferation of computing devices and the rapid growth of the Internet and use of the World Wide Web ("www"), physical objects-of-interest such as commercial entities, e.g., a bookstore, and even particular things, e.g., particular books on the store shelves, are related to one or more virtual representations—commonly referred to as "web pages." The virtual representations generally use text, audio, still or video images, and the like to describe or illustrate the related object-of-interest and possibly even offer associated commercial services. Each web page can represent one or more objects. These computerized constructs, often referred to as "cyberspace," a "virtual world," or hereinafter as simply "the web," have become an important economic reality, providing individuals continually improving personal and business activities convenience.

Bridges between the physical world and virtual world are rapidly appearing. Particularly, portable wireless communication devices and applications provide great convenience and wide use potential. One problem associated with such mobile devices is that there is an inherent imprecision of positioning systems. For example, most personal geophysical positioning system ("GPS") devices, relying on triangulation calculations based on acquisition of signals from three or more Earth-orbiting satellites, have an accuracy, or potential position variance, to only to about±five meters.

As links to the web proliferate, locating and acquiring a particular link associated with a specific object-of-interest without use of a full web browser search routine will be user-preferred. Discrimination between links associated with physically proximate objects becomes more difficult. For example, in an art museum, acquiring an immediate link to a web page for one specific object d'art in a room full of many becomes more complicated if each has its own link.

BRIEF SUMMARY

In a basic aspect, there is provided a method and apparatus for targeting physical world objects from a substantially portable computing device. A mechanism is provided for automatically adjusting the device field-of-vision, including compensating for lack of knowledge of the present precise location, such that all objects within the range of the device are accurately targeted. An exemplary embodiment of acquiring a link to a web beacon is described.

The foregoing summary is not intended to be an inclusive list of all the aspects, objects, advantages and features of described embodiments nor should any limitation on the scope of the invention be implied therefrom. This Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

Like reference designations represent like features throughout the drawings. The drawings referred to in this specification should be understood as not being drawn to scale except if specifically annotated.

DETAILED DESCRIPTION

Figure 1:
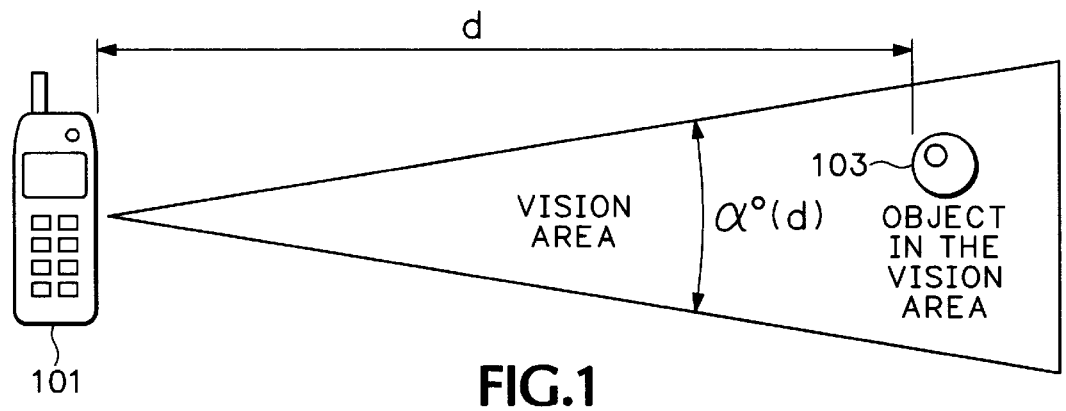
FIG. 1 is a schematic diagram illustrating a mobile device relative to an object-of-interest.

FIG. 1 is an illustration where an object-of-interest 103 is within range of targeting by a mobile device 101. In order to make the description of an exemplary embodiment of the present invention easier to understand, assume the device 101 is a portable telephone with digital view screen and having known manner Internet capability. Assume also that the object-of-interest 103 is mapped in a database of many objects; e.g., a database map of physical buildings in a given city where each mapped building has an associated web page. Also assume there is a possibility that there are one or more web links associated with the object-of-interest 103, e.g., a department store within a line-of-sight of the user of the device 101. It should be recognized that a wide variety of applications and implementations can be envisioned; the use of specific exemplary embodiments described herein are for convenience; no limitation on the scope of the invention is intended nor should any be implied therefrom.

Figure 2:
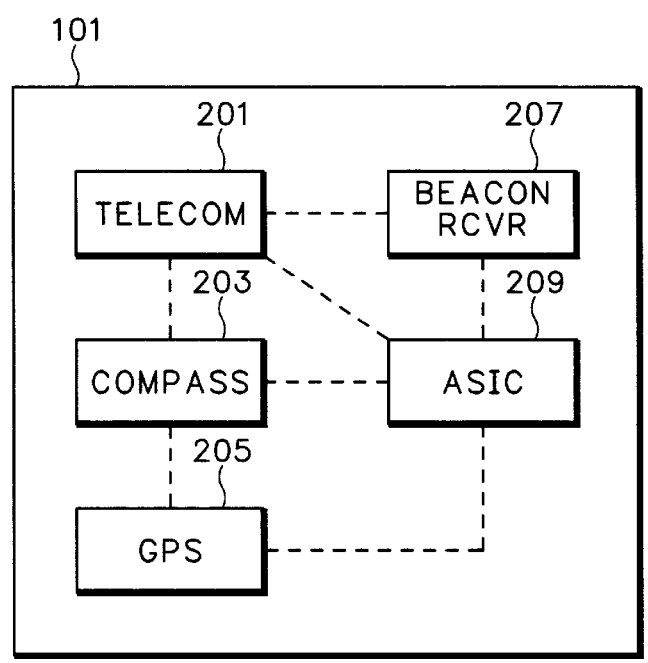
FIG. 2 is a schematic block diagram of an exemplary mobile device as shown in FIG. 1.

Looking also to FIG. 2, this mobile device 101 is equipped with known manner telecommunications hardware and software/firmware, including a web compatible program, here shown as a labeled box, "telecom" 201. The mobile device 101 is also provided with self-locating subsystems, e.g, a magnetic compass 203 for determining current heading direction, and a subsystem 205, such as GPS, for determining current location of the device 101 within a predetermined variance according to the specific implementation of the GPS. In addition to the wireless telecom 201 subsystem, the device 101 has a known manner receiver 207 for obtaining "beacon" signals wherein it can receive wireless signals (RF, infrared, or the like) from an object 103. Note that this signal can be any type of broadcast identifying information associated with the object; for purposes of continuing the exemplary embodiment in an application associated with use of the web, let the beacon signal be indicative of a Uniform Resource Locator ("URL") of a web page associated with the object-of-interest 103, e.g., a department store product directory. Note however, that the "broadcast" can in fact be simply reflected light which can be acquired through a simple optical lens. For example, if the object-of-interest 103 is relatively large, such as a department store, and the user is interested in knowing whether the store carries a product, getting to the associated web URL could be as simple as aiming an optical lens for an attempt at acquisition of a related, "mapped," beacon; specific implementations can be tailored to connectivity needs. That is to say, the acquisition of a link to obtain data from the object-of-interest 103—in this example the URL associated with the store—does not rely upon connecting to the link itself as a prerequisite.

The device's receiver 207 will have a given "aperture"—$\alpha°(d)$—that is defined as a given angular range through which the mobile device 101 may be rotated while continuing acquisition at a distance "d" (rather than a global value the aperture will vary depending on "d"). For purpose of describing the invention, the term "vision angle" ("v°") is defined as the aperture angle of the mobile device if the self-positioning accuracy was perfect, and the term "vision area" ("$Vp_i$") is defined as the area where the device could maintain signal acquisition from the position "$p_i$" if the self-positioning accuracy was perfect.

A subsystem 209 for performing calculations, e.g., a known manner programmable microprocessor or application specific integrated circuit ("ASIC") is also provided, for performing calculations (which will be described in detail hereinafter) with respect to accuracy of precise location of the mobile device 101. For convenience, this subsystem 209 is referred to hereinafter as a "position recalculator 209."

Figure 3:
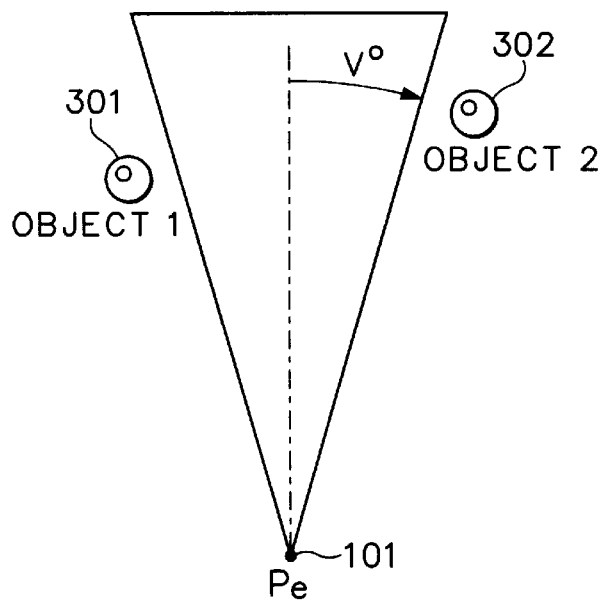
FIG. 3 is a schematic diagram showing an estimated mobile device (as in FIG. 2) location with respect to a plurality of objects-of-interest (as in FIG. 1).

FIG. 3 is an illustration showing that the mobile device 101 has an estimated location—"$p_e$"—from the data of the GPS 205 (FIG. 2) subsystem. Two objects 301, 302 are outside the constant vision angle "v°" of the mobile device 101. However, since the accuracy of the GPS 205 has a given variance, it is demonstrated by FIG. 4 that there is associated with the mobile device a circle-of-incertitude "Γ" (approximated for purpose of this description as a circle although in actuality a hemisphere having a height dimension and where for this embodiment the altitude of the device is ignored.) The mobile device 101 may actually be anywhere in the circle such as a perimeter location "$p_i$." The vision area 401 for the estimated device location $p_e$ is shown as $V(p_e)$ and the vision area 403 for the possible actual location $p_i$ is shown as $V(p_i)$. In other words, for this illustration, when the mobile device 101$_e$ thinks it is at location $p_e$ and it is in reality the device 101$_i$ at location $p_i$, the user could be pointing the mobile device 101 at an object and not acquiring the associated broadcast signal due to the variance of the positioning subsystem GPS 205. Conversely, if the mobile device 101 is actually at location $p_i$, it will acquire the object shown as object 302 when it was not the specific object-of-interest; in other words, the user, thinking from the GPS 205 data that they are at location $p_e$ when actually at location $p_i$, may be confused if a URL for Object 2 suddenly appears on the mobile device's screen due to the inaccuracy of actual location determination, even though the object-of-interest 405 which is outside vision area 403 between Object 1 and Object 2 is pointed at by the user.

The position recalculator 209 introduces a factor of "extended device vision," represented by the symbol "E." The extended device vision "E" is in effect a union of all vision areas from all the possible user locations in the circle-of-incertitude "Γ" for the mobile device 101 at a current estimated location, where the diameter of the circle-of-incertitude is defined by the predetermined variance inherent to the GPS subsystem 205. Note that this "circle" may take other shapes, e.g., ovoids, and the like. This union of all vision areas, the extended device vision can be defined by the equation:

$$E = U_{\pi \epsilon \Gamma} V(p_i) \quad \text{(Equation 1)},$$

where "$\epsilon \Gamma$" represents objects to detect.

Figure 4:
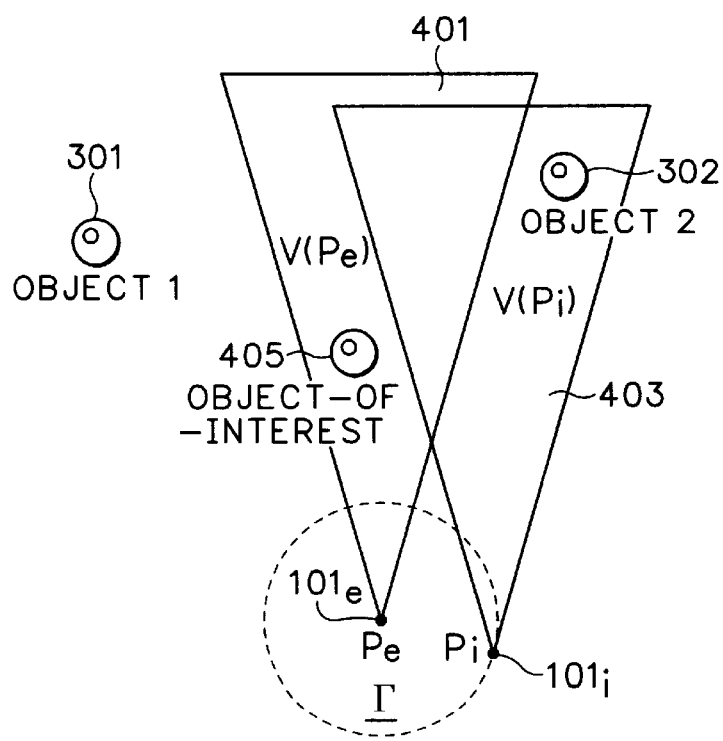
FIG. 4 is a schematic diagram illustrating a location incertitude construct associated with a mobile device as shown in FIGS. 1 and 3.
Figure 5:
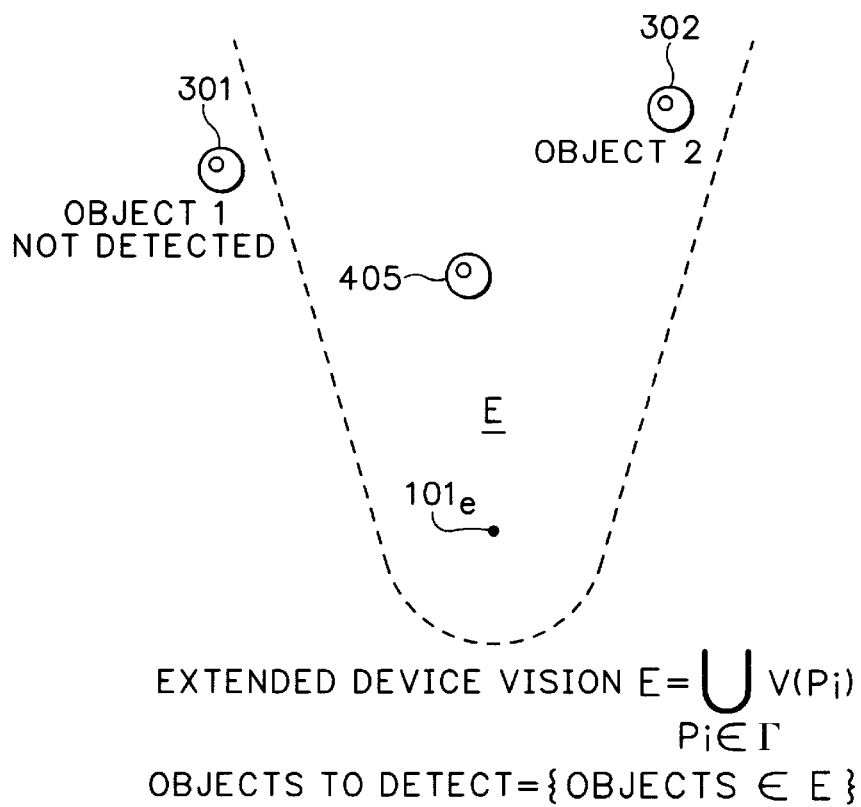
FIG. 5 is a schematic diagram illustrating an extended device vision construct.

FIG. 5 is a representation of the introduced extended device vision for the same factors shown in FIG. 4, illustrating that Object 2 (302)—now assumed to be the actual object-of-interest—is detected even though the GPS 205 (FIG. 2) subsystem believes the mobile device 101$_e$ is at position $p_e$ when it can be actually elsewhere, "any $p_i$," within the circle-of-incertitude "Γ." In order to set up acquisition of an object-of-interest, e.g., obtaining a URL link from a beacon at Object 2 (302), the position recalculator 209 will detect all objects in "E" wherein the aperture of the device for an object depends on the object distance and is modulated by the GPS' position accuracy. While in this embodiment, the extended field of vision is shown as a parabolic construct, it will be recognized by those skilled in the art that other polygon constructs may be employed. Also, again, it should be noted that with added accounting for the height variance factor, an implementation may have a "vision volume" which is a three dimensional shape, e.g., a cone. Such an implementation can be made in order to have, to continue the previous example, a link to a beacon associated with only a particular floor of a multi-story department store.

Figure 6:
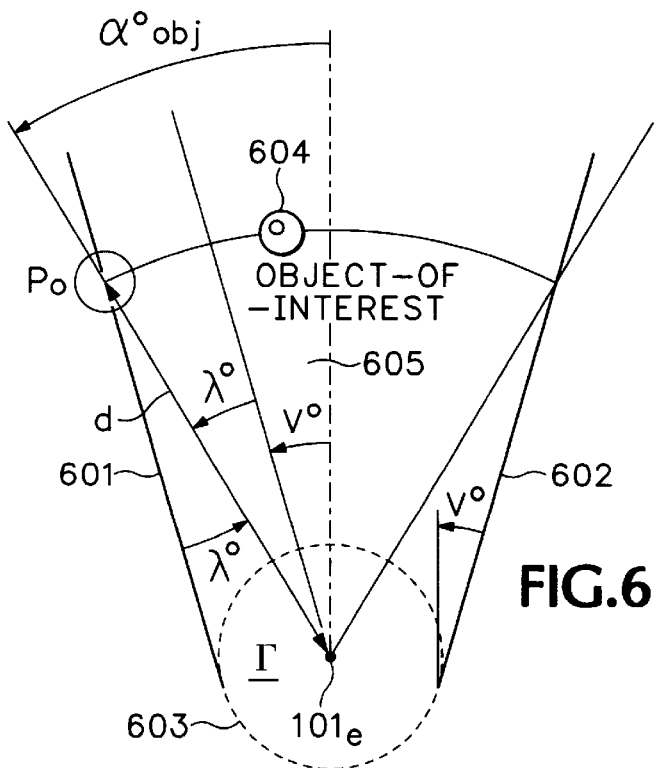
FIG. 6 is a diagram associated with calculating the extended device vision construct in accordance with FIG. 5.

Using FIG. 6 to illustrate, the calculation of the extended device vision is describing an extended device aperture "$\alpha°_{obj}$" covering all the extremes of possible position "$P_o$" of an object in the extended vision at a distance "d" from the mobile device 101$_e$. The maximum lines of sight describing the vision area for each possible position are now on the two tangents 601, 602 to the location circle-of-incertitude 603 and which have an angle to the device heading 604 equal to a vision angle 605 equal to the known vision angle of the device "v°." This can be described by the equation:

$$\alpha°_{obj} = \alpha°(d) = v° + \lambda° \quad \text{(Equation 2)},$$

where $\lambda° = \sin^{-1}(a/d)$.

In other words, this calculation as related to FIGS. 4 and 5 puts the mobile device 101 at every possible position within the circle-of-incertitude 603 Note that, extension of the tangent lines 601, 602 (FIG. 6) behind the mobile device 101 to an intersection thereof creates a virtual targeting, or "spotter," location with respect to the actual perceived location of the mobile device in the circle-of-incertitude. However, actual position of the mobile device 101 to be ascertained can only be within the circle-of-incertitude.

Therefore, one must consider the case where the circle-of-incertitude is very large; with the range of the object broadcast beacons being limited, using that virtual targeting focus location of the tangent lines in the calculations could move one mathematically out of range of an object actually within range. Thus, while this "virtual stepping backward" to the intersection of the tangent lines constructive spotter location can be employed for calculations, it is not a preferred embodiment.

Figure 7:
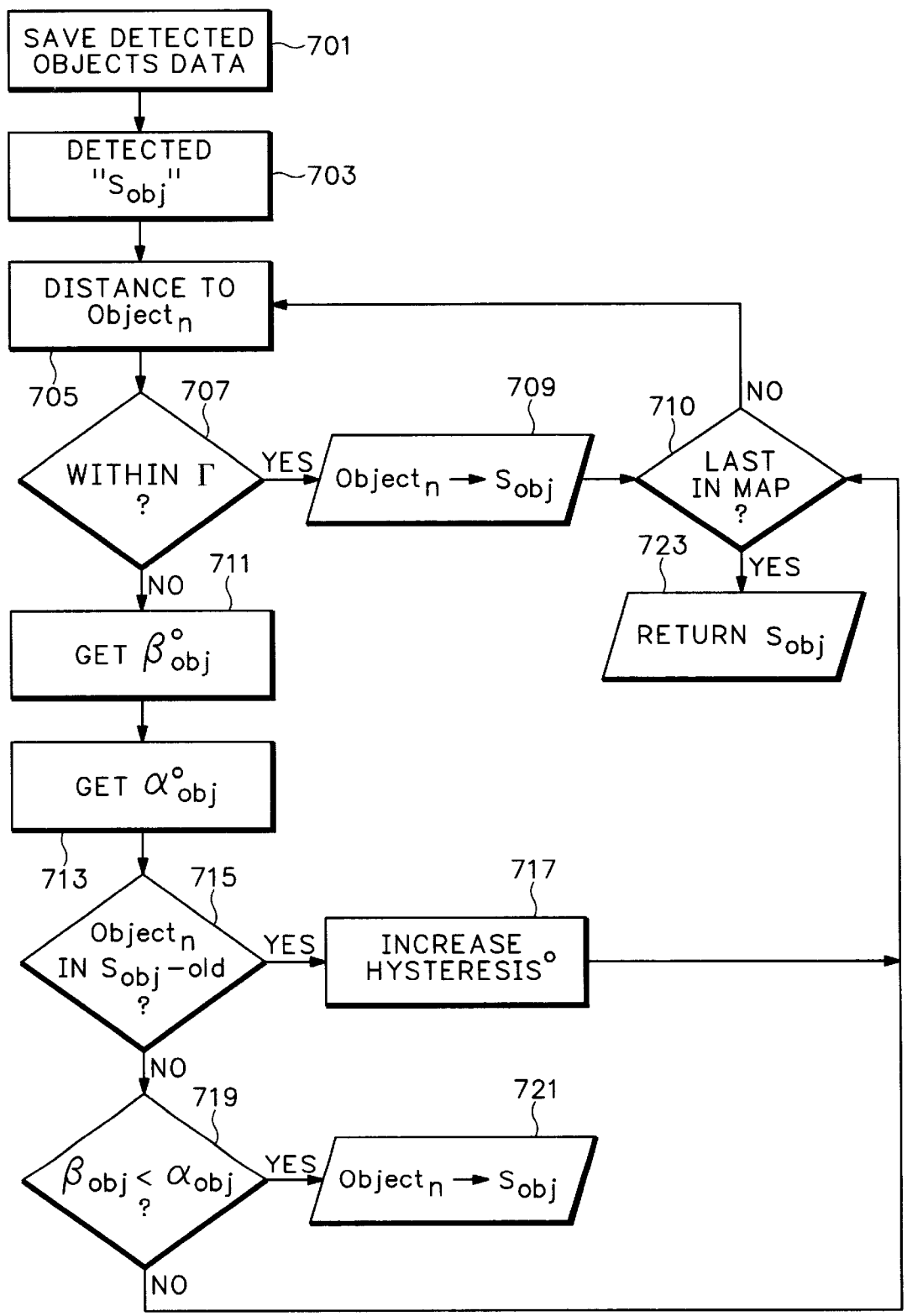
FIG. 7 is a flow chart associated with calculating the extended device vision construct in accordance with FIG. 5.
Figure 8:
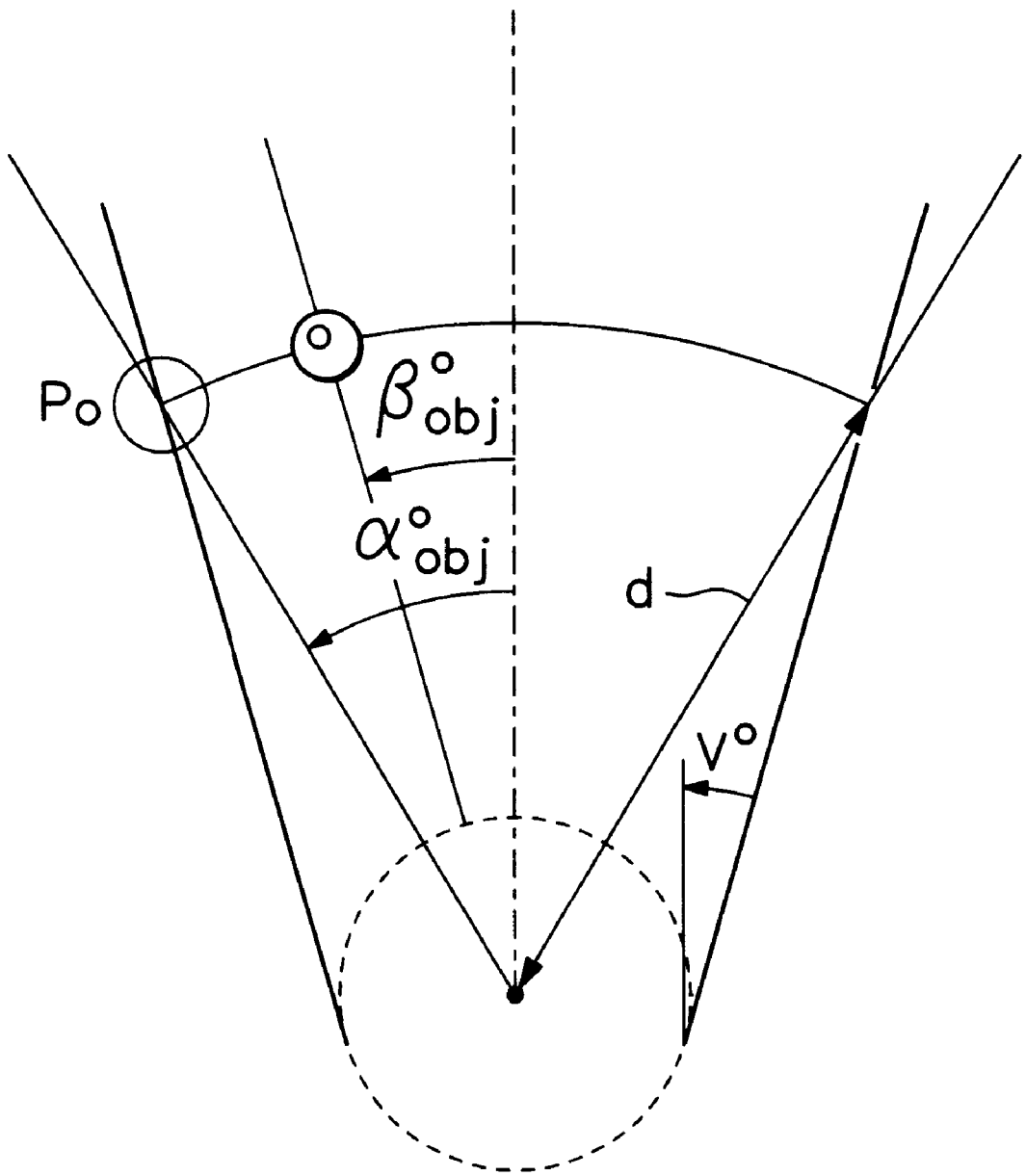
FIG. 8 is an illustration of the trigonometry associated with computation of extended device vision associated with the flow chart of FIG. 7.

FIG. 7 is a flow chart also illustration the repositioning calculation in accordance with the diagram of FIG. 8, illustrating adjustment of the aperture for each object. To find out which objects are in the extended vision of the device 101, a "Map" of the objects (a given database providing location, beacon frequency, and the like information with respect to all objects in the current Map), the approximate location of the device, $L_{device}$, the "Accuracy" of $L_{device}$, the device heading, "$A°_{device}$," and the old set of detected objects, "$S_{obj-old}$" are used.

A set of data related to all detected objects from the estimated location $p_e$, now defined as "$S_{obj-old}$," is saved, step 701. A register, or other temporary data storage, "$S_{obj}$," for detected objects is emptied, step 703. For each Object$_n$ in the Map, the distance "d" from the device to each is determined, step 705. It is determined if the object is within the circle-of-incertitude, step 707. If so, step 707, YES-path, the object is entered into the current $S_{obj}$ register, step 709. A check to determine if the current object-under-consideration is the last in the Map is made, and if not, step 710, NO-path, the process loops back to processing the next object. If the distance from the device to the current Object under consideration is greater than the radius of the circle-of-incertitude, step 707, NO-path, the angle $β°_{obj}$ between the device heading 604 and the current Object direction is determined, step 711.

Next, the aperture angle, $α_{obj}$, between the heading 604 and the extreme possible position $P_o$ of an object in the extended vision at distance "d" from the device is determined, step 713. If the acquired Object was already in the set of old detected objects, $S_{obj-old}$, step 715, YES-path, an angle hysteresis° limit is increased, step 717. Hysteresis° is an arbitrary parameter which is set to make already detected objects harder to lose. This means that an object will remain for a limited time even after it has left the current vision area. This avoids having a jitter of objects close to the boundary of the vision area.

Next, step 715-NO path, if the angle $β°_{obj}$ 711 is smaller than angle $α_{obj}$ 713, step 719, YES-path, the current object is added to the detected object list, $S_{obj}$ step 721. If not, step 719, NO-path, the process reruns the check step 710 until all objects have been processed. Once all objects have been processed, step 710, YES-path, the list of detected objects, Sobj, is returned, step 723. For example, list is provided on a display screen of the mobile device 101 from which the user can choose a particular target object of all the objects in the extended field of vision that are so listed. Effectively, once a specific Object is selected from the list, the focus of the mobile device 101 becomes any broadcast, e.g., URL beacon, of the selected Object.

Note that for objects are within the circle-of-incertitude, that is within the resolution of the mobile device's position accuracy range, that the algorithm is automatically self-adjusting, having an adaptive fidelity aspect. Note also that from an optical sensing perspective, the algorithm equates to "seeing" all objects within range simultaneously with binocular vision, all objects being superimposed and having a width related to the distance (i.e., closer is bigger). That is, for each object there is created a different field of vision from the same location.

In pseudo-code, the calculation can be described as follows:

<compute—Object (Map, $L_{device}$, Accuracy, v°, $S_{obj}$)
$S_{obj-old} ← S_{obj}$
$S_{obj} ←$ empty
for each Object in Map,
   d ← Object Distance from ($L_{device}$)
   if (D<Accuracy),
     then, $S_{obj} ←$ Object,
   otherwise
     $β°_{obj} ←$ ObjectBearing ($L_{user}$)
     $α°_{obj} ←$ SweepAngle (D, Accuracy, v°)
     if (Object $∈ S_{obj-old}$)
       $β°_{obj} ← β°_{obj} +$ hysteresis°
     if ($α°_{obj} < β°_{obj}$)
       Sobj ← Object
return Sobj>.

The aperture, $α°_{obj}$, ranges from a minimum value, equal to the vision angle, "v°," up to 360°. By studying the equation, it can be recognized that the minimum aperture will appear when the object is far away from the device ("d" is relatively large and "λ°" is relatively small), while the maximum aperture will appear when the object is close. The algorithm preserves perception of distance.

Thus, a compensation for tolerances inherent in state-of-the-art locating and targeting is provided. Based upon known approximate position and heading of the spotter, and certain data related to objects with the a vision area, an expanded field of vision related to the perspective of a virtual spotter location is generated. Compensation for present location variance due to locator equipment inherent tolerance is provided such that targeting of each object in the vision area can be precisely implemented.

The foregoing description, illustrating certain embodiments and implementations, is not intended to be exhaustive nor to limit the invention to the precise form or to exemplary embodiments disclosed. Obviously, many modifications and variations will be apparent to practitioners skilled in this art. Similarly, any process steps described might be interchangeable with other steps in order to achieve the same result. At least one embodiment was chosen and described in order to best explain the principles of the invention and its best mode practical application, thereby to enable others skilled in the art to understand the invention for various embodiments and with various modifications as are suited to the particular use or implementation contemplated. The scope of the invention can be determined from the claims appended hereto and their equivalents. Reference to an element in the singular is not intended to mean "one and only one" unless explicitly so stated, but rather means "one or more." Moreover, no element, component, nor method step in the present disclosure is intended to be dedicated to the public regardless of whether the element, component, or method step is explicitly recited in the following claims. No claim element herein is to be construed under the provisions of 31 U.S.C. Sec. 112, sixth paragraph, unless the element is expressly recited using the phrase "means for . . . " and no process step herein is to be construed under those provisions unless the step or steps are expressly recited using the phrase "comprising the step(s) of . . . "

What is claimed is:

1. A positioning device comprising:
  means for determining heading of the device;
  means for determining current position of the device within a predetermined variance;

means for targeting objects within a vision area of the device and receiving a signal indicative of capture of one or more said objects;

means for determining the identity of said objects, including approximate distance from said current position; and from said heading, said position, and distance, means for compensating for said predetermined variance and for adjusting field-of-vision of said means for targeting relative to each of said objects.

2. The device as set forth in claim 1 further comprising:

means for displaying a list of one or more said objects within said field-of-vision.

3. The device as set forth in claim 2 comprising:

means for connecting to a respective Internet link related to said objects from said list.

4. The device as set forth in claim 1 wherein aperture of the device for each of said objects respectively depends on each object distance and is modulated by the variance.

5. The device as set forth in claim 1 wherein said means for targeting objects is a receiver for accepting a predetermined beacon signal from said objects.

6. The device as set forth in claim 1 wherein said adjusting field-of-vision is a union of all vision areas from all the possible user locations in a circle-of-incertitude around said device defined by said variance.

7. The device as set forth in claim 6 wherein said union of all vision areas is described by the equation $$E = U_{\pi \epsilon [} V(p_i),$$

where "$\epsilon [$" is the objects to detect, vision area "$Vp_i$" is defined as area where the device could maintain signal acquisition from the position "$p_i$" if said variance is zero.

8. The device as set forth in claim 1 wherein said means for compensating and for adjusting is programmable.

9. A method for compensating position variance of a positioning device, the method comprising:

storing a map of potentially detectable objects;

saving a set of data $S_{obj-old}$ related to all actually detected objects from an estimated location $p_e$;

creating a temporary data storage, "$S_{obj}$";

for each of the actually detected objects$_n$, determining distance "d" from the device, and if any of said objects is within a predetermined area, storing those objects into the temporary data storage;

for each of said objects which are outside the predetermined area, determining an angle $\beta°_{obj}$ between device heading and each current one of said objects outside the predetermined area direction;

for each of said objects outside the predetermined area, determining aperture angle, $\alpha_{obj}$, between the device heading and an extreme possible position $P_o$ of an object at distance, d, from the device;

for each individual one of said objects outside the predetermined area, determining if angle $\beta°_{obj}$ is smaller than angle $\alpha_{obj}$ and, if so, current said individual one is added to the temporary data storage, $S_{obj}$, and, if not, ignoring said current said individual one and repeating said determining if angle $\beta°_{obj}$ is smaller than angle $\alpha_{obj}$ for remaining individual ones of said objects outside the predetermined area; and displaying Sobj.

10. The method as set forth in claim 9 comprising:

if a currently said individual one of the objects outside said the predetermined area matches an object in said set of data, $S_{obj-old}$, angle hysteresis° limit is increased, where hysteresis° is an arbitrary parameter which is set to make already detected objects harder to lose.

11. A method for compensating for tolerances inherent in state-of-the-art locating and targeting apparatus, the method comprising:

based upon known approximate position and heading of the apparatus and predetermined data related to objects with a vision area of the apparatus, generating an expanded field-of-vision related to the perspective of a virtual position of the apparatus; and displaying objects within said expanded field-of-vision area such that compensation for present location variance due to apparatus inherent tolerance.

12. The method as set forth in claim 1 wherein targeting of each of said objects in the vision area is corrected for incertitude of said approximate position of said apparatus.

13. The method as set forth in claim 1 in a programmable mobile targeting apparatus.

14. The method as set forth in claim 13 wherein said programming is implemented in accordance with the following computer code:

<compute—Object (Map, $L_{device}$, Accuracy, v°, $S_{obj}$)

$S_{obj-old} \leftarrow S_{obj}$ $S_{obj} \leftarrow$ empty for each Object in Map, d$\leftarrow$Object Distance from ($L_{device}$)

if (D<Accuracy), then, $S_{obj} \leftarrow$Object, otherwise $\beta°_{obj} \leftarrow$ObjectBearing ($L_{user}$)

$\alpha°_{obj} \leftarrow$SweepAngle (D, Accuracy, v°)

if (Object $\epsilon$ $S_{obj-old}$)

$\beta°_{obj} \leftarrow \beta°_{obj} \leftarrow$hysteresis° if ($\alpha°_{obj} < \beta°_{obj}$)

Sobj$\leftarrow$Object return Sobj>.

15. A portable positioning device comprising:

a housing;

interconnected within said housing, a compassing subsystem, a geophysical positioning subsystem, a targeting-and-receiving subsystem for targeting objects within a vision area of the device and receiving a signal indicative of capture of said object, a database of positioning-and-targeting information related to potential objects-of-interest, and a programmable computing subsystem having programming such that from heading, current approximate position, and current approximate distance, said computing subsystem provides an adjusting of field-of-vision of said targeting-and-receiving subsystem relative to each of said objects within the vision area, compensating for predetermined variances of said compassing subsystem and geophysical positioning subsystem of the device.

16. The device as set forth in claim 15 further comprising:

a visual display providing a list of one or more objects within said field-of-vision.

17. The device as set forth in claim 16, said computing subsystem further comprising:

programming for establishing an Internet link to a selected object from said list.

18. The device as set forth in claim 15 wherein said targeting-and-receiving subsystem includes a receiver for accepting a predetermined beacon signal from said objects.

* * * * *